(12) United States Patent
Forest et al.

(10) Patent No.: US 7,036,371 B2
(45) Date of Patent: May 2, 2006

(54) DEVICE FOR DETECTION OF AN UNBALANCED OIL MASS IN A ROTOR, ROTOR FITTED WITH SUCH A DEVICE, AND MACHINE EQUIPPED WITH SUCH A ROTOR

(75) Inventors: Francis Forest, Yerres (FR); Michel Franchet, Mayet (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/937,389

(22) Filed: Sep. 10, 2004

(65) Prior Publication Data
US 2005/0069439 A1  Mar. 31, 2005

(30) Foreign Application Priority Data
Sep. 25, 2003  (FR) ................................. 03 50606

(51) Int. Cl.
*G01M 1/16* (2006.01)
(52) U.S. Cl. ........................................................ 73/460
(58) Field of Classification Search .................. 73/460
See application file for complete search history.

(56) References Cited
FOREIGN PATENT DOCUMENTS
WO  WO 01/86130  11/2001

*Primary Examiner*—Hezron Williams
*Assistant Examiner*—Tamiko Bellamy
(74) *Attorney, Agent, or Firm*—Oblon, Spivak, McClelland, Maier & Neustadt, P.C.

(57) ABSTRACT

The device for detection of an oil unbalanced mass inside the rotor of a machine includes a device configured to entrain oil present in the rotor in rotation, such that the oil rotation speed is practically the same as the rotation speed of said rotor.

13 Claims, 2 Drawing Sheets

DEVICE FOR DETECTION OF AN UNBALANCED OIL MASS IN A ROTOR, ROTOR FITTED WITH SUCH A DEVICE, AND MACHINE EQUIPPED WITH SUCH A ROTOR

TECHNICAL DOMAIN

This invention relates to the technical domain of rotors of machines particularly such as shaft lines, turbines, compressors and turbomachines. It is particularly applicable to rotors installed in aircraft engines.

More precisely, the invention relates to devices designed to compensate for unbalanced oil masses inside such rotors.

STATE OF PRIOR ART

Vibrations frequently occur in machine rotors, generated by an unbalanced mass, and they can cause destruction of parts.

A distinction is made between unbalanced mechanical masses and unbalanced oil masses.

An unbalanced mechanical mass can be caused by the loss of a blade or the breakage of a rotating part. A mechanical unbalanced mass rotates with the rotor at the same speed as the rotor. A mechanical unbalanced mass is conventionally detected using an accelerometer placed on a fixed part, for example such as a casing or a bearing support. This detection consists of measuring vibration amplitudes recorded as a function of the rotor rotation speed frequency, in other words its fundamental frequency or the first harmonic. If the measured vibration amplitude is greater than a predetermined value, an alarm is triggered to attract the attention of an operator, and at the same time the machine is automatically stopped or slowed to protect it while waiting for the operator to take action on the machine.

An oil unbalanced mass is caused by the presence of oil accumulated in the rotor. This oil originates from lubricated parts, such as shaft bearings or moving parts, when a seal has been damaged or destroyed, either by accident or by wear. Oil then penetrates into the rotor due to pressures in the different chambers, and is unable to escape.

Attempts have been made to drill the rotor so that oil can escape and be collected in chambers external to the rotor, but this solution is not satisfactory because the presence of holes in the rotor weakens it to the extent that its life is reduced by a factor of two or three.

When oil accumulates in the rotor, it is in the form of an oil film uniformly distributed on the inside surface of the rotor. When the oil thus accumulated reaches a certain quantity, it forms an <<oil wave>> that is entrained in rotation by rotation of the rotor, and the rotation speed of the wave is equal to substantially 0.9 times the rotation speed of the rotor. This difference between the rotation speed of the rotor and the rotation speed of the oil is due to the viscosity of the oil. The oil unbalanced mass is due to the displacement of this oil wave inside the rotor. It turns in the rotor at a rotation speed different from the rotation speed of the rotor. An oil unbalanced mass can cause serious damage very quickly and must be detected quickly. For example, in the case of typical sized turbomachines used at the present time, a few cubic centimetres of oil is sufficient to cause an unbalanced mass that generates vibrations that the machine is incapable of resisting.

One simple solution would consist of oversizing parts to increase their resistance to vibrations, but this solution cannot be adopted due to size, weight and cost reasons.

Therefore, the objective is to detect an oil unbalanced mass in the rotor, before this mass has caused destruction of any parts.

One simple solution would consist of using instruments to detect mechanical unbalanced masses that are usually already installed on the machine, to also detect oil unbalanced masses. But this solution is impossible, since the instruments used to detect mechanical unbalanced masses are tuned to the rotor rotation speed, while the oil wave moves at a speed equal to substantially 0.9 times said rotor rotation speed, and therefore the mechanical unbalanced mass detection devices cannot detect the presence of the oil wave.

Another solution would consist of equipping the machine with additional accelerometers tuned to a speed of substantially 0.9 times the rotor rotation speed. But this solution is complicated and expensive.

SUMMARY OF THE INVENTION

The invention proposes to solve the problem described above which consists of detecting the presence of an oil unbalanced mass in the rotor of a machine such as a shaft line, a turbine, a compressor or a turbomachine, before this oil unbalanced mass generates vibrations capable of destroying the rotor or other parts of the machine.

The selected solution described in this invention consists of making oil accumulated inside the rotor rotate at the same speed as the rotor, and then detecting it using mechanical unbalanced mass detectors tuned to the rotor rotation speed.

One important advantage of the solution according to the invention is that it makes it possible to use mechanical unbalanced mass devices already installed on the machine.

According to a first aspect, the invention relates to a device for detection of an oil unbalanced mass inside a machine rotor, that includes means of entraining oil present in the rotor in rotation such that the oil rotation speed is practically the same as the rotation speed of said rotor.

Preferably, said means of entraining the oil in rotation include means of trapping the oil in contact with the rotor by the centrifugal effect.

According to a first embodiment of the device, said means of trapping oil are open compartments on the inside of the rotor, formed by the inside surface of the rotor and by substantially longitudinal ribs arranged on the inside surface of said rotor.

According to a second embodiment of the device, said means of trapping oil are open compartments on the inside of the rotor, formed by cavities hollowed out in the thickness of the rotor, starting from the inside surface of the rotor.

Preferably, the compartments according to the first or the second embodiment are uniformly distributed around the circumference of the inside surface of the rotor.

According to a third embodiment of the device, said means of trapping oil comprise a removable sheath inserted inside the rotor and that rotates with the rotor due to the centrifugal effect, said sheath comprising a substantially longitudinal gutter arranged so that it projects inwards into said sheath and means of balancing said gutter, and means of allowing oil to enter said gutter.

Preferably, said oil inlet means comprise orifices arranged on the same side of said gutter.

Preferably, said sheath comprises a longitudinal slit arranged substantially diametrically opposite said gutter, and said gutter balancing means comprise folded longitudinal edges of said slit.

According to a second aspect, the invention relates to a rotor equipped with a device for detection of an oil unbalanced mass according to the first aspect of the invention.

According to a third aspect, the invention relates to a machine equipped with a rotor according to the second aspect of the invention. In particular, this machine may be an aircraft engine.

BRIEF DESCRIPTION OF THE DRAWINGS

The invention will be better understood after reading the following detailed description of particular embodiments of the invention, provided for illustrative purposes only and that are in no way limitative, with reference to the attached drawings in which.

DETAILED PRESENTATION OF PARTICULAR EMBODIMENTS

Figure 1:
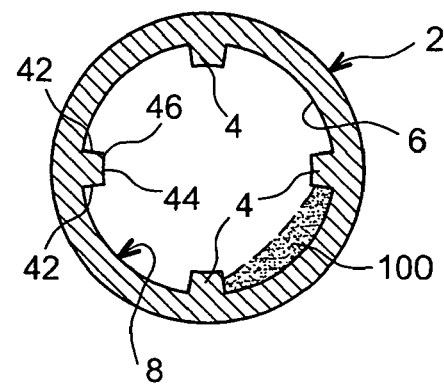
FIG. 1 shows a cross sectional view illustrating a first embodiment of the device according to the invention.

FIG. 1 illustrates a device for detection of an oil unbalanced mass according to the first embodiment of the invention. The rotor 2 is fitted with ribs 4 arranged substantially longitudinally and that project towards the inside of said rotor 2. In the example shown, the ribs 4 have an substantially quadrangular section. They comprise two side faces 42 that are adjacent to the inside surface 6 of the rotor, and a third face 44 intermediate between the two side faces 42. The function of these ribs is to create open compartments 8. The bottom of each compartment 8 thus formed is composed of part of the inside surface 6 of the rotor between two ribs 4, and the walls are the side faces 44 of the two ribs 4 delimiting the compartment. When a quantity of oil 100 has penetrated into the rotor 2, it is retained in one or several compartments 8 formed between two ribs 2. In the example shown, the junction between each side face 42 and the intermediate face 44 of each rib 4 consists of a sharp edge 46 that substantially forms a right angle. It could be envisaged that said junction would form an edge that prolongs the intermediate face 44, so as to increase the oil retention capacity of the compartment.

Figure 2:
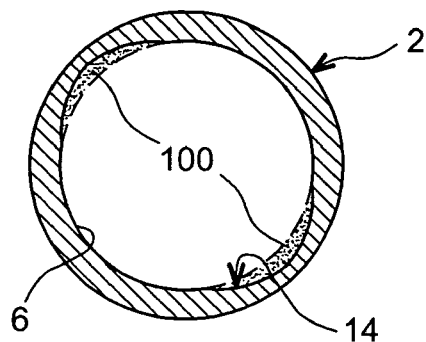
FIG. 2 shows a cross sectional view illustrating a second embodiment of the device according to the invention.

FIG. 2 illustrates a device for detection of an oil unbalanced mass according to the second embodiment of the invention. Cavities 14 are formed in the rotor 2 by hollowing out of the thickness of the rotor 2, and are open towards the inside of the rotor 2. In the example shown, the cavities 14 have a curved section and are substantially lobe-shaped. They could have different shapes, chosen as a function of manufacturing constraints. The cavities 14 form open compartments 14. When a quantity of oil 100 has penetrated into the rotor 2, it is retained in one or several compartments 14 thus formed.

The first and second embodiments of the device according to the invention that have just been described are both obtained by modifying the geometry of the inside surface of the rotor 2. With the first embodiment, material (the ribs 4) is added. With the second embodiment, material (the cavities 14) is removed. In each case, it is essential that no additional mechanical unbalanced mass should be created, that could be superposed on an existing oil unbalanced mass. Consequently, the geometry of the rotor 2 is modified while remaining symmetrical. Symmetry is obtained by creating an even number of compartments 8, 14 and arranging them so that pairs of compartments are diametrically opposite each other. Preferably, they are arranged so that they are uniformly distributed around the circumference of the inside surface 6 of the rotor 2. The number of compartments is not critical. The number of ribs 4 can thus be other than four, and the number of cavities 14 can be other than two.

However, when the quantity of oil present is large compared with the dimensions of the rotor 2, there is no guarantee that the quantity of oil 100 present in the rotor 2 will be uniformly distributed in the compartments 8, 14.

In a first situation, the distribution of the oil quantity 100 is not uniform, and therefore there is a risk that a mechanical unbalanced mass could be formed rotating at the same rotation speed as the rotor 2 and harmful for the machine.

In a second situation, the distribution of the oil quantity 100 is uniform, and therefore no mechanical unbalanced mass will be created as long as the rotor 2 is rotating. When the rotor 2 stops rotating, the entire quantity of oil 100 collects in the bottom part of the rotor 2, due to the effect of gravity. Then, when the rotor 2 restarts, the situation is the same as that described above, with a non-uniform distribution of the quantity of oil 100, and therefore creating a harmful mechanical unbalanced mass.

Figure 3:
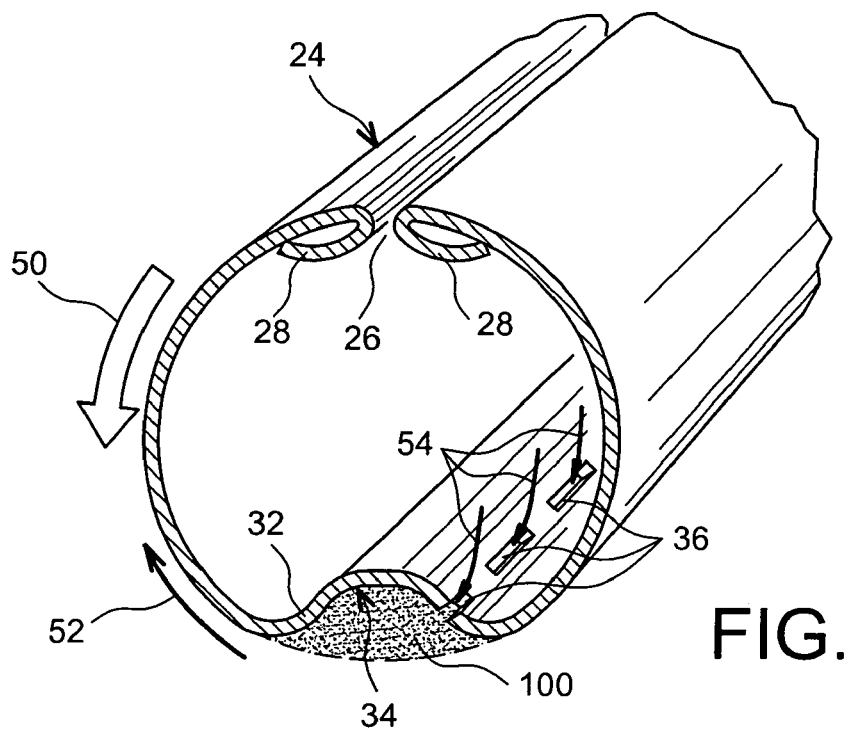
FIG. 3 shows a cross sectional view and a perspective view illustrating a third embodiment of the device according to the invention.

This is why it is preferred to use a device for detection of an oil unbalanced mass according to the third embodiment of the invention, as shown in FIG. 3, if the quantity of oil that could be accumulated in the rotor is large relative to the dimensions of the rotor.

FIG. 3 shows a removable sheath 24, that will be inserted inside a rotor, said rotor not being shown. The sheath 32 is sized so that it fits inside the rotor and remains in close contact with it due to the centrifugal effect. Thus, the rotor and the sheath rotate together.

The sheath 24 is provided with a gutter 32 arranged substantially along a longitudinal direction of said sheath 24, and projecting towards the inside of the sheath. One side only of the gutter 32, preferably close to its base, is provided with orifices 36 distributed along the entire length of the gutter. The side on which the orifices 36 are located is chosen as a function of the direction of rotation of the rotor, as will be described later.

The sheath 32 also comprises a slit 26 arranged substantially along the longitudinal direction of said sheath 32, being diametrically opposite the gutter 32. The edges 28 of the sheath 24 on each side of the slit 26 are folded back on themselves, so as to form an accumulation of material diametrically opposite the gutter 32.

The device according to the third embodiment of the invention functions as follows. When the rotor and the sheath 24 are rotating, as represented by the arrow 50, oil that arrives in the rotor is firstly trapped between the rotor and the sheath 24, and is entrained in rotation as represented by the arrow 52, in the direction opposite to the direction of rotation of the assembly consisting of the rotor and the sheath 24. When oil that was previously trapped between the rotor and the sheath 24 reaches the slit 26, it penetrates into the sheath 24 through said slit 26. The orifices 36 of the gutter 32 are drilled through the gutter on the side upstream from the slit 26, when circulation is in the same direction of rotation as the assembly composed of the rotor and the sheath 24. With this direction of rotation (arrow 50) and this corresponding position of the orifices 36, oil that had penetrated into the sheath 32 will be adjacent to the gutter 32 on which the orifices 36 are drilled. Consequently, oil passes through the orifices 36 and through the wall of the sheath 24, as indicated by the arrows 54. It is then retained between the sheath 24 and the rotor, in a compartment 34 formed between gutter 32 and the part of the rotor facing the gutter 34. This compartment 34 is a closed compartment, except for the orifices 36 through which oil enters into the compartment 34. The oil is thus retained or trapped. It cannot escape from the compartment 34 through the orifices 36, since there are no orifices in the gutter 34 on the side downstream from the slit 26 for circulation in the direction of rotation of the assembly consisting of the rotor and the sheath 24.

Preferably, the oil inlet orifices 36 are elongated and narrow, so that oil cannot accidentally escape through them.

The edges 28 of the slit 26 are folded back on themselves so that their weight balances the weight of the gutter 32 and the quantity of oil 100 trapped in the compartment 34, so as to form means 28 of balancing said gutter 32 and the trapped oil.

The device according to the third embodiment has the advantage that it introduces an additional removable part (the sheath) without modifying the structure and/or the geometry of the rotor.

Said sheath is preferably made from a circular section cylindrical plate, stamped and recessed to form a longitudinal gutter, and that is slit to form a longitudinal slit, the gutter and the slit being diametrically opposite each other, the edges of the plate on each side of the slit being folded back on themselves towards the inside of the plate, and the orifices are drilled on only one side of the gutter.

Figure 4:
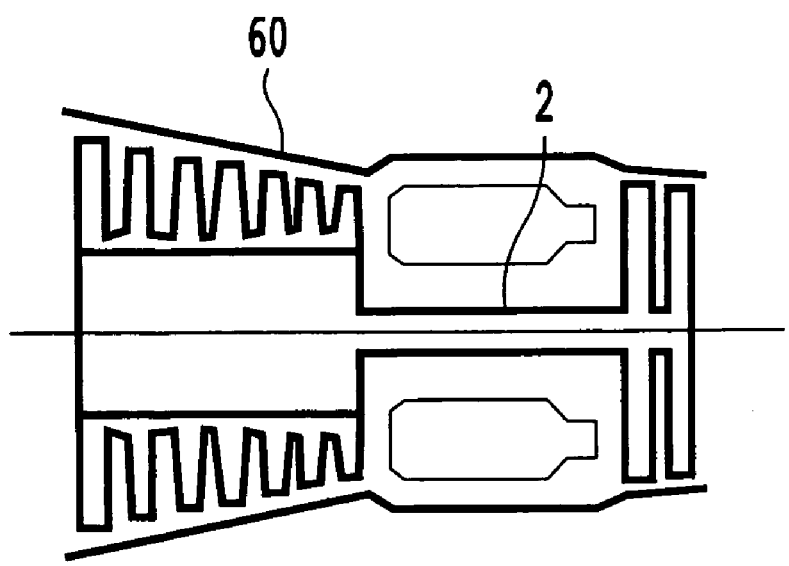
FIG. 4 shows a cross sectional view of a machine with the device according to the invention.

FIG. 4 illustrates a machine 60 comprising rotor 2 according to an embodiment of the invention.

What is claimed is:

1. A device for detection of an oil unbalanced mass inside a rotor of a machine, wherein it includes means of entraining oil present in the rotor in rotation, such that the oil rotation speed is substantially the same as the rotation speed of said rotor.

2. A device according to claim 1, wherein said means of entraining the oil in rotation include means of trapping the oil in contact with the rotor by the centrifugal effect.

3. A device according to claim 2, wherein said means of trapping oil include compartments uniformly distributed around the circumference of the inside surface of the rotor.

4. A device according to claim 3, wherein said compartments are open compartments on the inside of the rotor, formed by the inside surface of said rotor and by ribs arranged substantially longitudinally on the inside surface of said rotor.

5. A device according to claim 3, wherein said compartments are open compartments on the inside of the rotor, formed by cavities hollowed out in the thickness of the rotor starting from the inside surface of the rotor.

6. A device according to claim 2, wherein said means of trapping oil comprise a removable sheath inserted inside the rotor and rotate with the rotor (2) due to the centrifugal effect, and said sheath comprises a substantially longitudinal gutter arranged so that the substantially longitudinal gutter projects inwards into said sheath and means of balancing said gutter, and means of allowing oil to enter said gutter.

7. A device according to claim 6, wherein said sheath comprises a longitudinal slit arranged substantially diametrically opposite said gutter, and said balancing means of the gutter comprise folded longitudinal edges folded back on said slit.

8. A device according to claim 7, wherein the sheath is made from a circular section cylindrical plate, stamped and recessed to form a longitudinal gutter and is slit to form a longitudinal slit, the gutter and the slit being diametrically opposite each other, the edges of the plate on each side of the slit are folded back on themselves towards the inside of the plate, and the orifices are drilled on only one side of the gutter.

9. A device according to claim 6, wherein said oil inlet means comprise orifices arranged on the same side of said gutter.

10. A device according to claim 9, wherein said sheath comprises a longitudinal slit arranged substantially diametrically opposite said gutter, and said balancing means of the gutter comprise folded longitudinal edges folded back on said slit.

11. A device according to claim 10, wherein the sheath is made from a circular section cylindrical plate, stamped and recessed to form a longitudinal gutter and is slit to form a longitudinal slit, the gutter and the slit being diametrically opposite each other, the edges of the plate on each side of the slit are folded back on themselves towards the inside of the plate, and the orifices are drilled on only one side of the gutter.

12. A rotor, wherein the rotor is provided with a device for detection of an oil unbalanced mass according to any one of claims 1 to 11.

13. A machine, wherein the machine is provided with a rotor according to claim 12.

* * * * *